(12) United States Patent
Amonou et al.

(10) Patent No.: US 8,743,950 B2
(45) Date of Patent: Jun. 3, 2014

(54) METHOD FOR FILTERING, TRANSMITTING AND RECEIVING SCALABLE VIDEO STREAMS, AND CORRESPONDING PROGRAMS, SERVER, INTERMEDIATE NODE AND TERMINAL

(75) Inventors: Isabelle Amonou, Thorigne Fouillard (FR); Stephane Pateux, Saint Gregoire (FR); Gerard Babonneau, Thorigne Fouillard (FR)

(73) Assignee: France Telecom, Paris (FR)

( * ) Notice: Subject to any disclaimer, the term of this patent is extended or adjusted under 35 U.S.C. 154(b) by 1215 days.

(21) Appl. No.: 11/996,196

(22) PCT Filed: Jul. 18, 2006

(86) PCT No.: PCT/EP2006/064382
§ 371 (c)(1),
(2), (4) Date: Aug. 20, 2008

(87) PCT Pub. No.: WO2007/009996
PCT Pub. Date: Jan. 25, 2007

(65) Prior Publication Data
US 2008/0310497 A1    Dec. 18, 2008

(30) Foreign Application Priority Data
Jul. 19, 2005 (FR) .................................. 05 07690

(51) Int. Cl.
| | |
|---|---|
| H04N 7/12 | (2006.01) |
| H04N 11/02 | (2006.01) |
| H04N 11/04 | (2006.01) |
| G03B 13/00 | (2006.01) |
| G06F 15/16 | (2006.01) |

(52) U.S. Cl.
USPC ............. 375/240.01; 375/240.16; 348/663; 709/246

(58) Field of Classification Search
USPC ............ 375/240.03–240.24, 240.25, 240.01; 386/68–111; 709/224–246; 725/112–135; 348/402–416, 663–667
See application file for complete search history.

(56) References Cited

U.S. PATENT DOCUMENTS 5,621,660 A * 4/1997 Chaddha et al. .............. 709/247
(Continued)

FOREIGN PATENT DOCUMENTS

| WO | WO 00/65837 | 11/2000 |
|---|---|---|
| WO | WO 02/31670 | 4/2002 |

OTHER PUBLICATIONS

International Preliminary Report on Patentability from counterpart foreign Application No. PCT/EP2006/64382.
International Search Report from counterpart foreign Application No. PCT/EP2006/64382.

(Continued)

*Primary Examiner* — Man Phan
(74) *Attorney, Agent, or Firm* — David D. Brush; Westman, Champlin & Kelly, P.A.

(57) ABSTRACT

A method is provided for filtering a scalable video stream, organized in the form of data unit blocks, each of which comprises a base data unit and a set of data units distributed according to two types of enhancement data, corresponding respectively to time and/or space and/or quality characteristics and making it possible to define several quality levels. The method defines at least two distinct filtering profiles, or paths of each block data units, wherein each path defines a row of successive foldover positions and each foldover position uses at least by one less data units than a previous position, and selects one of the paths according to a predetermined criterion, taking into account the type of content of the stream and/or at least one information item representing the capacities of a terminal receiving the stream.

16 Claims, 6 Drawing Sheets

(56) References Cited

U.S. PATENT DOCUMENTS

| | | | | |
|---|---|---|---|---|
| 5,708,473 | A * | 1/1998 | Mead | 375/240.15 |
| 5,844,613 | A * | 12/1998 | Chaddha | 375/240.12 |
| 6,233,017 | B1 | 5/2001 | Chaddha | 348/412 |
| 7,260,521 | B1 * | 8/2007 | Bessette et al. | 704/219 |
| 7,538,823 | B1 * | 5/2009 | Singh et al. | 348/663 |
| 8,184,702 | B2 * | 5/2012 | Jeong et al. | 375/240.16 |
| 2002/0073238 | A1 * | 6/2002 | Doron | 709/246 |
| 2005/0158026 | A1 * | 7/2005 | Shin et al. | 386/68 |
| 2005/0163224 | A1 * | 7/2005 | Shin et al. | 375/240.25 |
| 2006/0156363 | A1 * | 7/2006 | Wu et al. | 725/113 |
| 2007/0127576 | A1 * | 6/2007 | Henocq et al. | 375/240.16 |
| 2007/0248158 | A1 * | 10/2007 | Vieron et al. | 375/240.01 |
| 2009/0067493 | A1 * | 3/2009 | Jun et al. | 375/240.03 |
| 2010/0005184 | A1 * | 1/2010 | Babonneau et al. | 709/231 |
| 2010/0150224 | A1 * | 6/2010 | Pateux et al. | 375/240.02 |

OTHER PUBLICATIONS

Steven McCanne et al. "Low-Complexity Video Coding for Receiver-Driven Layered Multicast." (XP011054678). Aug. 1997.

Van der Schaar, M. et al. "A Novel MPEG-4 Based Hybrid Temporal-SNR Scalability for Internet Video." (XP010529525). Sep. 10, 2000.

Tihao Chiang et al. "Hierarchical Coding of Digital Television." (XP000451094). May 1, 1994.

Thomas Rathgen et al. "Coding of Moving Pictures and Audio." (XP002385303). Apr. 2005.

French Search Report dated Jun. 19, 2006 for corresponding French Application No. FR 0507690, filed Jul. 19, 2005.

JSVM 2.0: Joint Video Team (JVT) of ISO/IEC MPEG & ITU-T VCEG, N7084, Joint Scalable Video Model (JSVM) 2.0 Reference Encoding Algorithm Description, Apr. 2005, Busan (Julien Reichel, Heiko Schwarz, Mathias Wien).

WD 2: J. Reichel, H. Schwarz, M. Wein—Scalable Video Coding—Working draft 2—ISO/IEC JTC1/SC29/WG084, Apr. 2005, Busan.

* cited by examiner

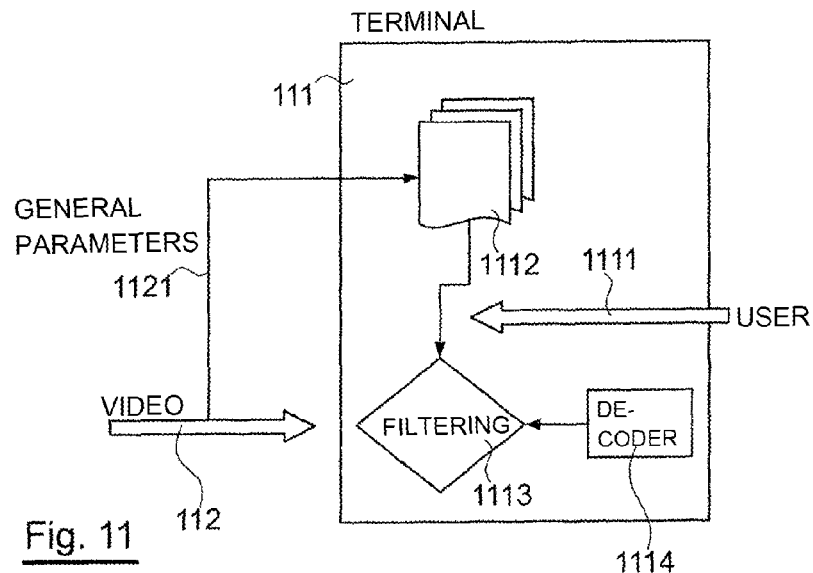
Fig. 11
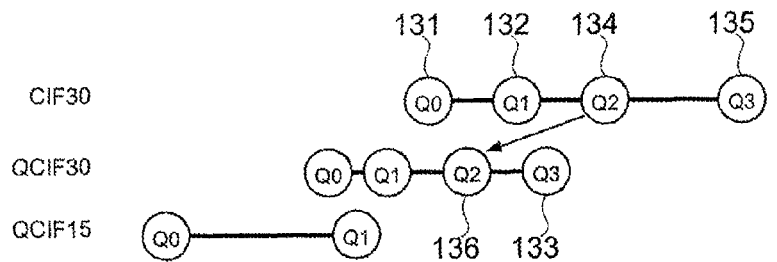
Fig. 13
| Priority_id used for parsing | QCIF@15Hz Low Q | High Q | QCIF@30Hz Low Q | High Q | CIF@15Hz Low Q | High Q | CIF@15Hz Low Q | High Q |
|---|---|---|---|---|---|---|---|---|
| 0 | 1A | 5A | 9A+B | 13A+B | 17A+C | 21A+C | 25A+B+C+D | 29A+B+C+D |
| 1 | 2A | 6A+E | 10A+B | 14A+B+E | 18A+C | 22A+C+E | 26A+B+C+D | 30A+B+C+D+E |
| 2 | 3A | 7A+E | 11A+B | 15A+(B+E)+F | 19A+C | 23A+(C+E)+G | 27A+B+C+D | 31A+(B+C+E)+(D+F+G) |
| 3 | 4A | 8A+E | 12A+B | 16A+(B+E)+F | 20A+C | 24A+(C+E)+G | 28A+B+C+D | 32A+(B+C+E)+(D+F+G)+H |
Fig. 6

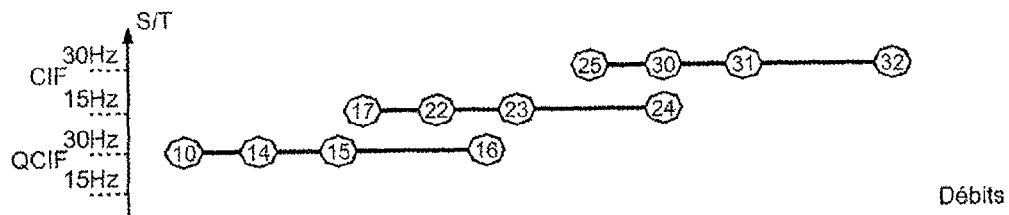
Fig. 7
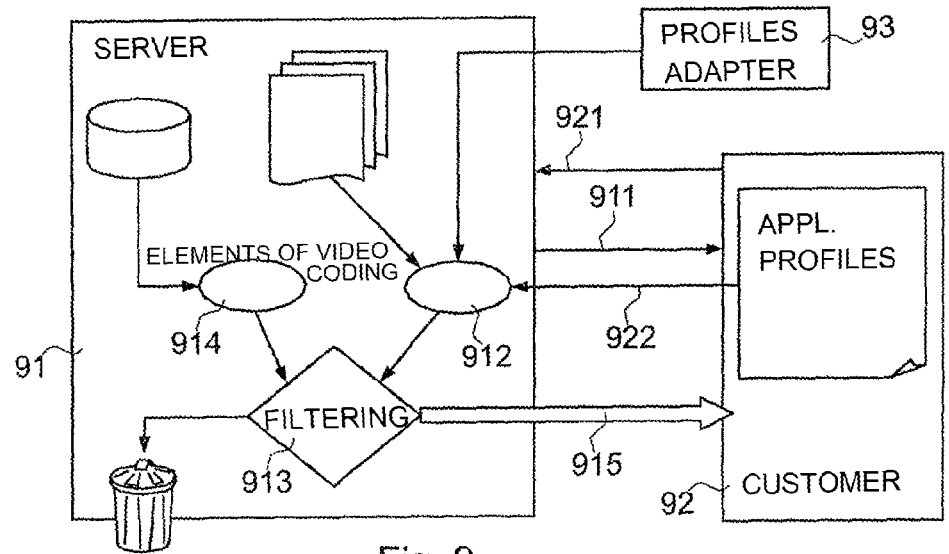
Fig. 8
Fig. 9

METHOD FOR FILTERING, TRANSMITTING AND RECEIVING SCALABLE VIDEO STREAMS, AND CORRESPONDING PROGRAMS, SERVER, INTERMEDIATE NODE AND TERMINAL

CROSS-REFERENCE TO RELATED APPLICATIONS

This application is a Section 371 National Stage Application of International Application No. PCT/EP2006/064382, filed Jul. 18, 2006 and published as WO 2007/009996A1 on Jan. 25, 2007, not in English.

FIELD OF THE DISCLOSURE

The field of the disclosure is that of the processing of video signals and more particularly of video sequences compressed in scalable form. More specifically, the disclosure concerns the improvement of the exploitation of a scalable stream, especially but not exclusively in the context of the encoding scheme currently being developed in MPEG4-SVC.

This MPEG4-SVC technique is presented especially in the following documents:

JSVM 2.0: Joint Video Team (JVT) of ISO/IEC MPEG & ITU-T VCEG, N7084, Joint Scalable Video Model (JSVM) 2.0 Reference Encoding Algorithm Description, April 2005, Busan (Julien Reichel, Heiko Schwarz, Mathias Wien); and WD 2: J. Reichel, H. Schwarz, M. Wien—Scalable Video Coding—Working Draft 2-ISO/IEC JTC1/SC29/WG11, W7084, April 2005, Busan.

BACKGROUND OF THE DISCLOSURE

1. Scalable Video Systems

At present, most video encoders generate a single compressed stream corresponding to an entire encoded sequence. Each customer wishing to exploit the compressed file for decoding and viewing must download or stream the entire compressed file for this purpose.

Now, in a heterogenous system (for example the Internet), not all customers have the same type of access to data in terms of bandwidth and processing capacities, and the screens of the different customers may be very different (for example on an Internet type network, one customer could have an 1024-kb/s ADSL bit rate and a powerful microcomputer (PC) while another will have only modem access or a PDA).

One obvious solution to this problem is to generate several compressed streams corresponding to different levels of bit-rate/resolution of the video sequence: this is known as simulcast. However, this solution is sub-optimal in terms of efficiency and assumes prior knowledge of the characteristics of all the potential customers.

More recently, video encoding algorithms known as scalable algorithms have emerged. These are algorithms with adaptable quality and variable space-time resolution, for which the encoder generates a stream compressed in several layers, each of these layers being nested into the higher-level layer. These algorithms are now being adopted as an amendment to the MPEG4-AVC standard (known as SVC here below in this document).

Such encoders are very useful for all applications in which the generation of a single compressed stream, organised in several layers of scalability, may serve several clients with different characteristics, for example:

video on demand or VOD service (target terminals: UMTS, PC ADSL, TV ADSL etc);
session mobility (resumption on a PDA of a video session begun on TV; or resumption on an UMTS mobile unit of a session begun on GPRS);
session continuity (sharing of the bandwidth with a new application);
high-definition TV (a single encoding to serve SD or standard definition and HD or high-definition customers);
videoconferencing (only one encoding for UMTS/Internet customers);
etc.

1.1 Grain of the Scalability

A scalable video stream can be considered to be a set of sub-streams represented by cubes 11 in a 3D space formed by the three dimensions of space 12, time 13, and quality or SNR 14 (S, T, Q), as illustrated schematically in FIG. 1.

The size of the increments in the different directions corresponds to the "grain" of the scalability: it may be fine, medium (10% of bit rate per increment of scalability: MGS) or coarse (25% bit rate per increment: CGS).

Here below, the CGS scalability shall be deemed to correspond to a "layered" system (as described in the document MPEG2005/M12043, April 2005. "ISO/MP4 File Format for Storage of Scalable Video", Thomas Rathgen, Peter Amon and Andreas Hutter) and MGS shall be deemed to correspond to a "level-based" system as described in this same document.

1.2 Fine Scalability Mode (MGS)

A scalable bitstream can be organised to support fine scalability. Here below, reference will be made to MGS (medium grain scalability) in compliance with the rule adopted in the MPEG. From the bitstream, any consistent sub-stream can be extracted (including the base level) and decoded with the corresponding quality, i.e. any combination whatsoever of the resolution values supported (time, space or SNR) can be extracted. The MGS bit streams provide for the highest flexibility.

1.3 Layered Scalability Mode

As an alternative, a bitstream can be organised in layers. The term used then is CGS (coarse grain scalability) streams. A layer contains all the scalability levels needed to pass to the higher-quality layer. A layer must increase quality in at least one direction (time, space or SNR).

A CGS representation enables simple adaptation operations, especially at the level of the nodes on the network. The progress of the information in terms of quality, spatial resolution and time resolution are defined a priori according to the conditions dictated by an application or a user of the service.

2. MPEG-4 SVC

The JSVM MPEG is described in the document JSVM 2.0 referred to here above. The model chosen is based on a scalable encoder highly oriented toward AVC type solutions for which the schematic structure of a corresponding encoder is shown in FIG. 2. This is a pyramidal structure. The video input components 20 undergo dyadic sub-sampling (2D decimation by two referenced 21, 2D decimation by four referenced 22). Each of the sub-sampled streams then undergoes a temporal decomposition 23 of the MCTF (motion compensated temporal filtering) type. A low-resolution version of the video sequence is encoded 14 up to a given bit rate R_r0_max which corresponds to the maximum decodable bit rate for the low spatial resolution r0 (this base level is AVC compatible).

The higher levels are then encoded 25, 26 by subtraction of the previous rebuilt and over-sampled layer and encoding of the residues in the form:

of a base level;
possibly one or more enhancement levels obtained by bit-plane multiple-pass encoding (here below called SGS or fine grain scalability). The prediction residue is encoded up to a bit rate R_ri_max which corresponds to the maximum bit rate decodable for the resolution ri.

More specifically, the MCTF filtering blocks 23 carry out a temporal wavelet filtering operation, i.e. they realign the signals in the sense of the motion before wavelet filtering: they deliver information on motion 27 fed into the motion-encoding block 24-26, and texture information 28 fed into a prediction module 29. The pieces of predicted data, at output of the prediction module 29, serve to carry out an interpolation 210 from the lower level. They are also fed into a spatial conversion and entropic encoding block 211 that works on the refinement levels of the signal. A multiplexing module 212 arranges the different sub-streams generated in a comprehensive compressed data stream.

This novel approach is capable of giving medium grain scalable streams in the time, space and quality dimensions.

The following are the main characteristics of this technique:
- pyramidal solution with dyadic sub-sampling of the input components;
- temporal decomposition of the MCTF ("Motion Compensated Temporal Filtering") type at each level;
- encoding of the base level (AVC compatible);
- encoding of the higher levels by subtraction of the rebuilt previous level and encoding of the residues in the form:
  - of a base level; and
  - of one or more enhancement levels obtained by bit-plane multi-pass encoding (here below: FGS).

In order to obtain bit rate adaptation, the pieces of information on texture are encoded by means of a gradual scheme at each level:
- encoding of a first minimum quality level (called a base layer);
- encoding of gradual refinement levels (called an enhancement layers).

3. Architecture of the SVC Encoder

The SVC encoder is based on a two-layer system, like the AVC:
- The VCL ("Video Coding Layer") manages the encoding of the video;
- The NAL ("Network Abstraction Layer") provides an interface between the VCL and the exterior. In particular, this level organises the different NALU (NAL units or data units) given to it by the VCL, into AUs or access units.
  - A NALU is an elementary unit containing the basic level of a space-time image containing all (in the current version) or a part (this is under discussion for future versions) of an FGS level of a space-time image;
  - An AU is the set of the NALUs corresponding to an instant in time.

4. Signalling of the Modes of Scalability in the NAL SVC Layer

In order to be able to appropriately decode a NAL SVC, it should be possible to report its position in space (S,T,Q) as illustrated by FIG. 1.

Two signalling modes (corresponding substantially to the CGS and MGS modes) are currently under discussion in the JSVM: a fixed path signalling mode and a variable path signalling mode.

A simple example is given in FIG. 3 for a 2D (T, Q) context: a scalable video stream contains the nested representations of the sub-streams in CIF with temporal resolution of 15 Hz (31) and 30 Hz (32). The stream is formed by four NALUs A(0), B(2), C(1) and D(2). Using these four NALUs, it is possible to obtain the bit-rate/distortion points a, b, c, d. The priority of the NALUs is given between brackets.

In this example, it can be seen that there are several "paths" 33, 34 and 35, of possible decoding between the points a and d: (a,b,c,d) but also (a,b,d) or (a,c,d).

It will be understood that certain applications could give preference to one path over the other.

For example, it may be judicious to use the path (a,c,d) to obtain a fluid 30 Hz video but rather (a,b,d) if it is sought to emphasize quality at 15 Hz.

This path is therefore dependent on the application and the encoding method used.

5.1 Fixed Path

This mode signals a unique path in the 3D space for the extraction of the scalable stream. It is well adapted to the CGS modes for certain applications. In the example of FIG. 3, a fixed path will be chosen, for example (a,c,d).

This path will always be used, whether the decoding is done at 30 Hz or 15 Hz. The major drawback that appears then is that the point b will not be decoded, even at 15 Hz, whereas it could be more worthwhile to decode it to have a better quality at 15 Hz.

In this context, a single indicator enables this fixed path to be encoded.

5.2 Variable Path

This mode proposes to leave the choice of the extraction path to the application (or to the network). To do this, an additional element is introduced. This additional element is called a priority indicator and will enable a resolution of the problem evoked further above when the decoding is done at 30 Hz.

The following two tables respectively show the priorities assigned to the NALUs A, B, C and D in the above example and the result of the filtering at 15 Hz and 30 Hz according to the priority chosen when decoding (the elements decoded/kept are the NALUs that appear in the table). It should be noted that it is possible at 30 Hz to define several different paths as a function of the priority index assigned to the four NALUs.

|  | NAL | | | |
| --- | --- | --- | --- | --- |
|  | A | B | C | D |
| Priority | 0 | 2 | 1 | 3 |

| Filtering priority | 15 Hz | 30 Hz |
| --- | --- | --- |
| 0 | A | A |
| 1 | A | A + C |
| 2 | A + B | A + B + C |
| 3 | A + B | A + B + C + D |

The following are the filtering rules used:

For a target temporal resolution T (30 or 15 Hz) keep all the NALs for which the temporal resolution is smaller than or equal to the requested resolution (T_NAL <=T_Target) and the priority is lower than or equal to the priority requested (priority_NAL<=target_priority).

The method can be generalised to more than two dimensions: in the example illustrated in FIG. 4A, there are three dimensions of scalability:
- D=: QCIF/CIF (the dependency D is a subset of the spatial resolution S) ;
- T=Time: 15 Hz/30 Hz;
- Q=Quality/low/high complexity ("low/high").

An example of association of priorities with the different NALUs is specified in the figure, and an associated filtering example is shown in the table here below.

| Priority_id | QCIF@ 15 Hz | QCIF@ 30 Hz | CIF@ 15 Hz High complexity/SNR Low complexity/SNR | | CIF@ 30 Hz |
|---|---|---|---|---|---|
| 0 | A | A | A | A | A |
| 1 | A + E | A + (B + E) | A + (C + E) | A + C | A + (B + C + E) |
| 2 | A + E | A + (B + E) + F | A + (C + E) + G | A + C | A + (B + C + E) + (D + F + G) |
| 3 | A + E | A + (B + E) + F | A + (C + E) + G | A + C | A + (B + C + E) + (D + F + G) + H |

In this context, a double indicator is necessary: the "priority field" contains the priority indicator and the "decodability info" contains information on space, time and quality resolution. These two indicators necessitate a representation on two bytes. Thus, throughout the rest of the document, a NAL will be identified by its four indices (P, D, T, Q) accessible for example in the file header where:

P indicates the priority;
D indicates the dependency (superset of the spatial resolution S)
T indicates the time resolution;
Q indicates the quality or the complexity.

It will be noted that the cells in bold type in the above table show anomalies relative to the requested space-time resolution: in QCIF at 30 Hz, it would be desirable to benefit from the NALU B, and not only from the NALU A which is at 15 Hz.

The invention is aimed inter alia at overcoming this problem.

6. Drawbacks of the Prior Art

The fixed-path solution cannot be used to serve different applications simultaneously because there is only one relationship of dependency between the NALUs coming from a hierarchical encoder.

The multiple-path solution is more open than the fixed-path solution: it enables adaptation to different applications/resolutions in the network or at the decoder level. The increase in complexity remains limited but cannot be adapted to an adaptation of very low complexity as is done on certain network routers for example.

The fixed-path approach does not enable adaptation in time to different conditions on the user side, network side or server side: a customer cannot choose at any instant to give preference to one axis (for example that of temporal fluidity) over another (for example SNR quality) such as the choice dictated by the scheduling defined by the fixed adaptation path.

Neither of the two approaches (the fixed or variable approach) enables the management of a fall-back mode that would enable the user to reduce the quality or the resolution of the data received according to his own preferences.

SUMMARY

An aspect of the disclosure relates to a method for filtering a scalable video stream, organised in data unit blocks each comprising a base data unit and a set of enhancement data units distributed according to at least two types of enhancement data, corresponding respectively to time and/or space and/or quality characteristics and making it possible to define several levels of quality according to the number and type of enhancement data units used.

According to an embodiment of the invention, this method comprises a step for defining at least two distinct profiles, or paths, of filtering of the data units of each block, each path defining a series of successive fallback positions, from an initial position, each fallback position using at least one data unit less than the preceding position, and a step for selecting one of said paths as a function of a predetermined criterion taking account of a type of content of said stream and/or at least one piece of information representing capacities of the terminal receiving said stream.

Thus, an embodiment of the invention enables fine adaptation to a large number of contexts for which it is desirable to reduce or increase the quantity of information transmitted or received. It may for example involve the adapting of the data at the level of the server, the intermediate nodes, or translators, placed on the network or the terminal by the selection of a profile by the user.

Advantageously, a first of said paths gives preference to a characteristic representing the quality of each image, rebuilt by a terminal, and a second of said paths gives preference to a characteristic representing the fluidity of the video.

It is thus possible, depending on the content, to give preference to the quality of the image, for example for a film, or to the fluidity of the motions, for example for sports. Of course, many other paths (also called profiles) and variants can be defined.

Preferably, each of said enhancement data units carries at least two indicators enabling the defining of said paths from among the indicators belonging to the group comprising:
an indicator of priority (P)
an indicator of dependency, pertaining to the spatial resolution (D)
an indicator of temporal resolution (T);
an indicator of quality and/or complexity (Q).

According to an advantageous embodiment of the invention, said paths are stored in a paths file, associating each of said paths with a predetermined applications profile. This paths file may in particular be a file in the XML format.

It may for example be stored and/or computed on-the-fly by the terminals. In a preferred embodiment, said paths file is transmitted in said video stream, in the form of at least one information data unit.

Advantageously, the filtering method comprises the following steps:
separation of said enhancement of data units, as a function of the selected path, between data units to be used and discarded data units;
rebuilding of video images by means of said data units to be used;
storage of said discarded data unit.

This last step may correspond to a storage, for example on a hard disk drive, enabling the video to be replayed at a later stage with another level of quality, for example if the screen size is no longer the same. It may also pertain to storage in a buffer memory, for a transmission of the discarded data units to another transmission channel.

Naturally, the discarded data units may also be directly eliminated.

Advantageously, the method comprises the following steps:
- detection of at least one data unit to be used that is missing or has deteriorated;
- rebuilding of a video from data units corresponding to one of the fallback positions of the selected path.

Thus, in the event of loss of a packet, there is no loss of the restitution of the video but a simple passage to a lower quality.

The method of an embodiment of the invention can be implemented at different levels of the transmission chain, especially by at least one of said following elements:
- video stream server;
- intermediate node of transmission stream;
- receiver terminal of a video stream.

An embodiment of the invention also relates to a computer program product downloadable from a communications network and/or stored on a computer-readable carrier and/or executable by a microprocessor, characterised in that it comprises program code instructions for the implementation of at least one step of the filtering method described here above.

According to another aspect of the invention, it relates to a method of transmission of a scalable video stream by a video stream server to at least one receiver terminal via a transmission network, said stream being organised in data unit blocks each comprising a base data unit and a set of enhancement data units distributed according to at least two types of enhancement data, corresponding respectively to time and/or space and/or quality characteristics and making it possible to define several levels of quality according to the number and type of enhancement data units used.

This method comprises a transmission step for defining at least two distinct profiles, or paths, of filtering of the data units of each block, each path defining a series of successive fallback positions, from an initial position, each fallback position using at least one data unit less than the preceding position.

Said server and/or an intermediate node of said transmission network implement a step for selecting one of said paths as a function of a predetermined criterion taking account of a type of content of said stream and/or of at least one piece of information representing capacities of the terminal (or of several terminals) receiving said stream, and a step of transmission of the selected data units.

Advantageously, said server and/or said intermediate node implement said step of selection as a function of a piece of selection information sent by said terminal. It can also take account of synthesis of the information sent out by a group of terminals.

An embodiment of the invention also relates to a computer program product for the implementing of at least one step of this method of transmission of a scalable video stream.

According to another aspect, the invention relates to a method of reception in a receiver terminal of a scalable video stream transmitted by a video stream server, via a transmission network, said stream being organised in data unit blocks each comprising a base data unit and a set of enhancement data units distributed according to at least two types of enhancement data, corresponding respectively to time and/or space and/or quality characteristics and making it possible to define several levels of quality according to the number and type of enhancement data units used.

According to this method, at least two distinct profiles or paths of filtering the data units of each block are used, each path defining a series of successive fallback positions, from an initial position, each fallback position using at least one data unit less than the preceding position, and said receiver terminal implements a step for selecting one of said paths as a function of a predetermined criterion taking account of a type of content of said stream and/or at least one piece of information representing capacities of the terminal receiving said stream.

The notion of use of at least two profiles may mean that the terminal has preliminarily received these different profiles from the server and/or that it has computed them, for example on the fly. The selection of a path may be automatic (driven by the terminal) and/or performed at the user's initiative.

An embodiment of the invention also relates to a computer program product for the implementation of at least one step of this method of reception of a scalable video stream.

An embodiment of the invention also relates to the video stream servers, the intermediate nodes of a transmission network and the video stream receiver terminals comprising means to implement the methods described here below.

Finally, an embodiment of the invention relates to a signal designed to be transmitted from a server to at least one terminal, to enable the processing of a scalable video stream transmitted by said video stream server, via a transmission network, said stream being organised as described in detail here above. Such signal carries data for defining at least two distinct profiles, or paths, of filtering of the data units of each block, each path defining a series of successive fallback positions, each fallback position using at least one data unit less than the preceding position.

This signal thus enables the selection of one of said paths as a function of a predetermined criterion taking account of a type of content of said stream and/or of at least one piece of information representing capacities of the terminal (or of several terminals) receiving said stream.

According to an advantageous embodiment, the signal carries, on the one hand, said data units forming said video stream and, on the other hand, said definition data. The two elements can also be transmitted independently.

BRIEF DESCRIPTION OF THE DRAWINGS

Other characteristics and advantages shall appear more clearly from the following description of a preferred embodiment of the invention, given by way of a simple illustrative and non-exhaustive example, and from the appended drawings of which:

FIG. 6 illustrates a filtering table presenting two paths according to an embodiment of the invention;

FIG. 7 presents the ranges of bit rate corresponding to the table of FIG. 6;

FIG. 8 is another example of a filtering table according to an embodiment of the invention, using the notion of priority indicator;

FIGS. 9 to 11 illustrate three modes of implementation of embodiments of the invention, respectively in a customer-server model, the adaptation of the bit rate in an intermediate node and the adaptation to a terminal;

FIG. 13 illustrates the rebuilding of the dependencies for the fallback on the best possible quality in case of loss of a NALU;

DETAILED DESCRIPTION OF ILLUSTRATIVE EMBODIMENTS

1. Essential Elements of an Embodiment of the Invention

An embodiment of the invention therefore proposes the use, in the embodiment described here below, of the fields (P,D, T, Q) of SVC NALUs, in order to manage orders of priority depending on specified applications needs that can be used to obtain the adaptation of a video stream on the server side (bit rate regulation, adaptation to demand), the transmission nodes side (DiffServ, TOS) or the customer side (adaptation in terms of complexity etc).

The description is situated in the known generic filtering context, described here above. Each NAL is therefore defined by the quadruplet (P,D,T,Q).

The filtering is done in N of the 4 dimensions (N<=4).

There are fallback modes available, i.e. mechanisms enabling preference to be given to a path in space (D,T,Q) when the target resolution values cannot be attained (for reasons of diminishing of bit rate, complexity, user's choice etc).

According to an embodiment of the invention, a set of applications profiles (or paths) is defined. These application profiles therefore define different orders of priority on the fallback modes, as a function of criteria such as the type of video (sports or cinema for example), the type of terminal (processing capacity and memory capacity, size of the screen) and/or the capacities of the network. For example, in the former case, 2 profiles can be defined:

Sports profile: preferences given to time fluidity: SD@30 Hz high=>SD@30 Hz low=>CIF@30 Hz high=>CIF@15 Hz high Film profile: preference is given to quality over spatial fluidity and spatial resolution:

An applications profile is then defined by a sequence of values (P,D,T,Q)i.

The set of applications profiles can then be stored in a file, for example an XML file (this file being applied to a full sequence or else to segments of the sequence or again to a set of sequences). This file can be transmitted with the video stream or in a separate channel. It must be available before the start of the decoding of the sequence/segment etc). Another embodiment involves the carrying of these meta-parameters in information NALUs (for example SEI type NALUs).

Figure 5:
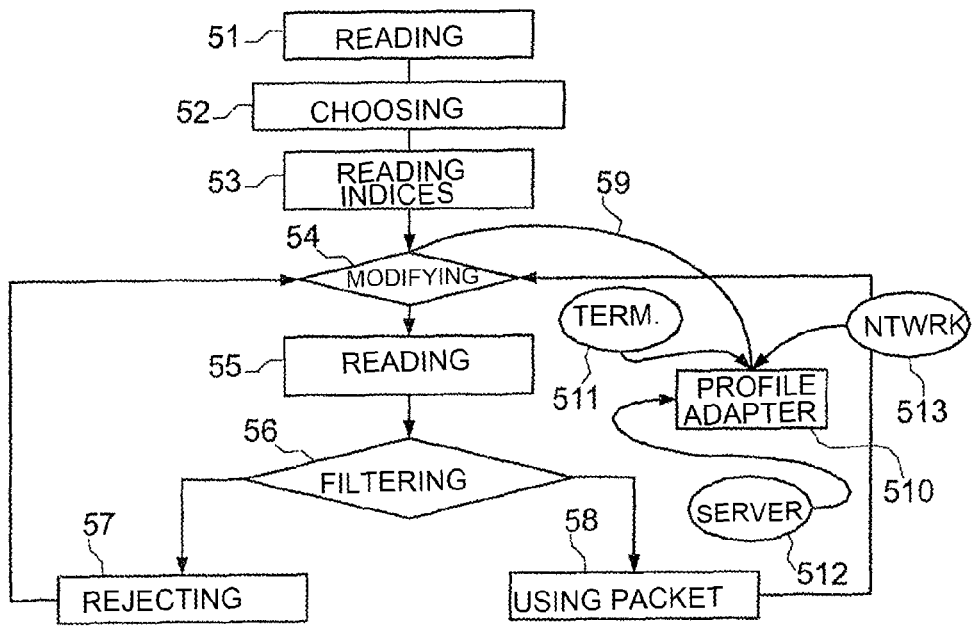
FIG. 5 is a simplified flow chart of the principle of an embodiment of the invention.

The running of the filtering method, illustrated by the flow chart of FIG. 5, is as follows:

1. Reading 51 of the files of the applications profiles containing the fallback modes and choosing 52:
   a. an initial mode of operation (for example sports) (fallback and ascent paths);
   b. an initial point of operation (for example high bit rate CIF@30 Hz); This point of operation can be updated externally (on the basis of adaptation in bit-rate, quality, complexity etc) in compliance with a defined fallback strategy;
2. Reading 53 of the indices of the scalable video unit to be processed: the header of the NAL is read for the information on space-time-quality resolution (P_paq, D_paq, T_paq, Q_paq) (one or more of the dimensions may be omitted);
3. Depending on the point of operation (updating or not by the external process):
   a. reading 55 of the mode of operation (for example: sports) associated with an upward or downward path enabling movement in the scalability space;
   b. choosing a point of operation (reading or computation of P'_target D'_target, T'_target, Q'_target)
4. Filtering 56:
   a. reducing the bit rate: elimination of the packets for which (P_paq, D_paq, T_paq, Q_Paq) are not compliant with the target, in accordance with the XML table;
   b. rejecting 57 or using 58 the packet (or NALU).
5. Modifying 54 (if necessary via an external or other process) of the point of operation:
   a. changing the mode of operation (passing from priority given to fluidity of the images to priority given to quality or spatial resolution);
   b. changing the point of operation (request for ascent or descent in quality of service).

The modification 54 takes account of an indicator 59 of fallback mode delivered by a profile adapter 510 controlled as the case may be by the customer terminal 511, the server 512 and the network 513.

Each of these steps is described in detail here below.

An embodiment of the invention relies on the definition of a relationship between the fields P, D, T, Q of the header of the NALUs in order to organise the video streams at the output of the method in accordance with the requirements of a particular service, or group of services.

2. Signaling of the NALUs

Figure 1:
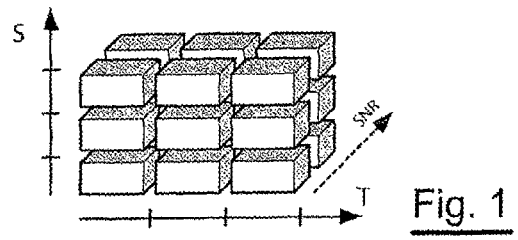
FIG. 1, already commented upon in the introduction, illustrates the structure of a scalable video stream, the sub-streams of which are represented by cubes in a three-dimensional space formed by the three dimensions of space, time and quality.
Figure 2:
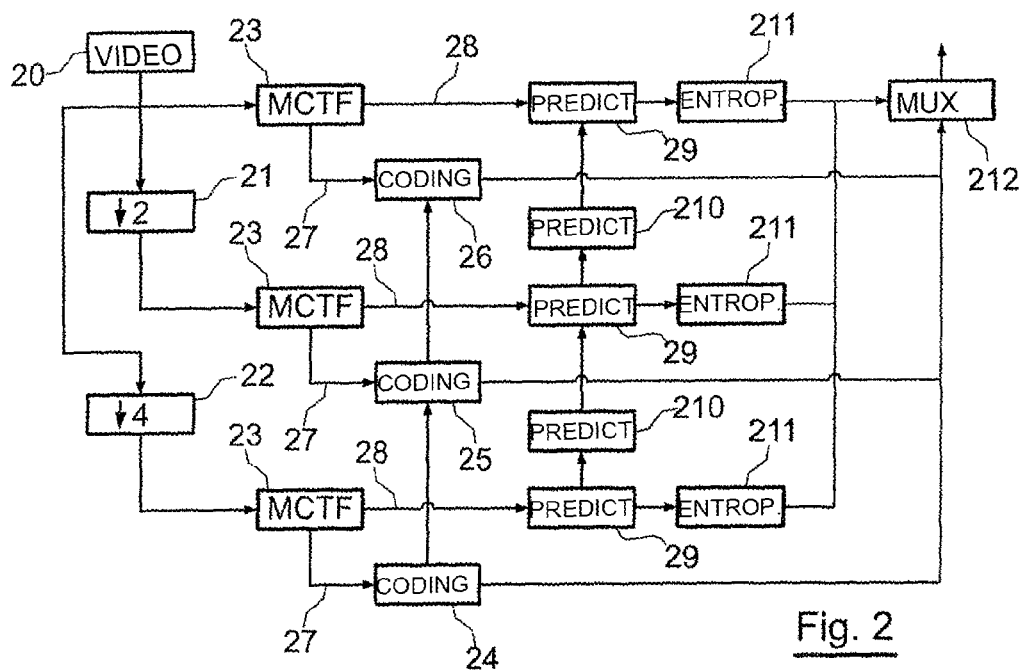
FIG. 2, also commented upon in the introduction, presents the schematic structure of an encoder of the stream of FIG. 1.
Figure 3:
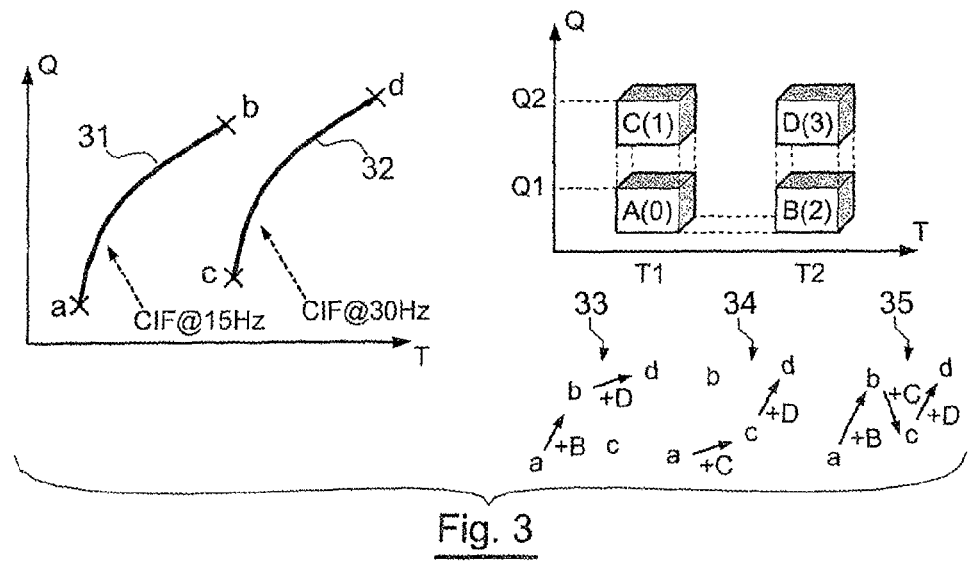
FIG. 3, commented upon in the introduction, is an example of structuring of a scalable stream in two dimensions, and of three corresponding paths.
Figure 4A:
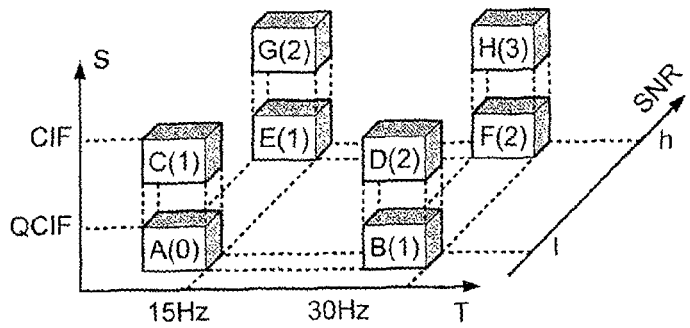
FIG. 4A, also commented upon in the introduction, illustrates an example of structuring in three dimensions of scalability.
Figure 4B:
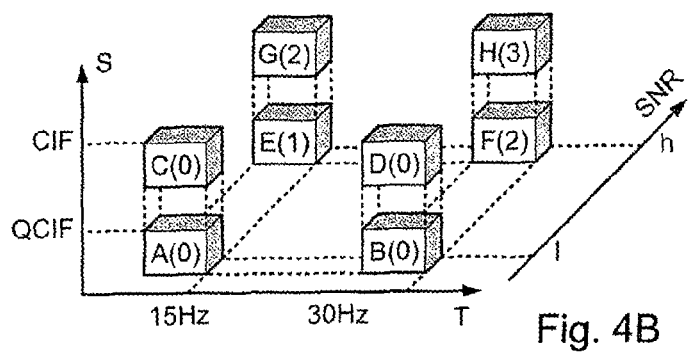
FIG. 4B presents a variant of distribution of the priorities for a NAL, according to one aspect of the invention.

In an advantageous embodiment, it is proposed to improve the numbering proposed in the prior art by declaring that each base level has priority_id 0. This approach is illustrated by FIG. 4B. It enables the efficient removal of the anomalous points between the requested and delivered values of space-time resolution (box shown in bold in the table corresponding to the prior art).

3. Setting Up of the Filtering Table

The filtering table illustrated in FIG. 6 is set up in accordance with the prior art. It is also possible, optionally, to compute a bit rate associated with each significant "box" of the table.

This table can be interpreted as a set of intervals of resolutions with bit rates that may or may not overlap one another. This interpretation is illustrated in FIG. 7. Within each interval, the bit rate increases with the Priority_id P.

In the table of FIG. 6, it can be noted that each series is monotonic in the table whereas the curve 61 is not monotonic. This is an advantage of the solution of an embodiment of the invention.

A fallback mode corresponds to a descent (arrows 61 and 62) in the table of FIG. 6. For example the following are defined:

a sports profile 61, according to which preference is given to temporal fluidity CIF@30 Hz high=>CIF@30 Hz low=>QCIF@30 Hz high=>QCIF@30 Hz Low>QCIF@ 15 Hz high;

a film profile 62, according to which quality is preferred to fluidity and spatial resolution:
CIF @30 Hz high=>CIF @15 Hz high=>QCIF @15 Hz high=>QCIF @7.5 Hz high.

The same approach can be defined by the progress of the bit rate ranges, as illustrated in FIG. 8:
sports profile 81:
SD@30 Hz (high to low)=>CIF@30 Hz (high to low)=> QCIF@30 Hz (high to low)
film profile 82 . . .

In order to define these fallback modes as a function of the applications, it is possible for example to imagine an XML file of the applications profiles, of the following type:

```
<?xml version="1.0"?>
<Root xmlns:xsi="http://www.w3.org/2001/XMLSchema-instance"
xsi:noNamespaceSchemaLocation="C:\My
Documents\Patents\DIH\Transport SVC\XML\Fallback.xsd">
    <3DSpace>
        <!-- Definition of ranges of operation for typical
resolutions -->
        <Range id="1" S="QCIF" T="15Hz" Q="low" PMin="0"
        PMax="0"/>
        <!--this first range corresponds to QCIF 15hz with
PMin=PMax, i.e. only one point"-->
        <Range id="2" S="QCIF" T="15Hz" Q="high" PMin="0"
PMax="1"/>
        <!--this first range correspond to QCIF 15hz with
PMin<PMax, several points"-->
        <Range id="3" S="QCIF" T="30Hz" Q="low" PMin="0"
        PMax="0"/>
        <Range id="4" S="QCIF" T="30Hz" Q="high"
        PMin="0"
PMax="3"/>
        <Range id="5" S="CIF" T="15Hz" Q="low" PMin="0"
        PMax="0"/>
        <Range id="6" S="CIF" T="15Hz" Q="high" PMin="1"
        PMax="2"/>
        <Range id="7" S="CIF" T="30Hz" Q="low" PMin="0"
        PMax="0"/>
        <Range id="8" S="CIF" T="30Hz" Q="high" PMin="0"
        PMax="3"/>
        <Range id="9" S="CIF" T="30Hz" Q="high" PMin="2"
        PMax="3"/>
    </3DSpace>
    <MyApplications>
        <Application name="application one">
            <!-- application number one -->
            <type> sports </type>
            <!--sports type application"-->
            <path_preference> temporal </path_preference>
            <RangeOrder> "8 4 2"</RangeOrder>
            <!-- This path indicates a preference for temporal
fluidity-->
            <bit rates>"150 150-300 450 450-900"</bit rates>
        </Application>
        <Application name="application two">
            <!-- application number two-->
            <type>film</type>
            <!--"film" type application-->
            <path_preference> quality</path_preference>
            <RangeOrder> "9 6 2"</RangeOrder>
            <!--This path indicates a preference for quality
relative to the other axes -->
            <bit rates> "100-200 400-600 800-900"</bit rates>
        </Application>
        <Application name="application three">
            <!-- my application number three-->
            <type>mobile</type>
            <path_preference> resolution</path_preference>
            <RangeOrder>"9 6 5"</RangeOrder>
            < bit rates />
        </Application>
    </MyApplications>
</Root>
```

A complete schema, enabling this example to be validated, is presented in section (7.) below.

Any other means of description of the applications profiles is possible, for example a table in a programming language, or an insertion in the video stream (SEI to be defined).

In the example of the XML file here above, operating ranges have been defined. These operating ranges correspond to a triplet of a value (DTQ) and a range of priority values: priority_id (Pmin, Pmax).

This priority_id range then makes it possible to offer a variation in quality/bit rate for a given resolution. The availability of different ranges from different space-time resolution values then make it possible to define fallback applications profiles.

An applications profile is then defined by a sequence of ranges. Thus, in this example, the sports profile passes from a range of bit rate in CIF@30 Hz to a bit rate range for QCIF@ 30 Hz and finally for QCIF@ 15 Hz, thus giving preference to temporal fluidity during the use of the fallback mode.

It must be noted that the bit rate ranges proposed in an applications mode can overlap (see FIG. 7). Thus, this permits a phenomenon of hysteresis in the algorithm described here below which then provides for greater stability of the system in limiting the use of the fallback modes.

4. Generic Adaptation Algorithm

Returning to the example of the applications profiles as described here above, an adaptation algorithm works as follows:

1—Reading of the applications profile. For example the XML file described here above:

a—selection of an applications mode. For example sports profile ("application one");

b—selection of an initial point of operation. By default, choice of the maximum mode of operation: Point having maximum priority_in the "range" 9. That is p_target=3, D_target=CIF, T_target=30 Hz, Q_target=High;

2—during a necessary adaptation, the external process then brings about a variation in the value of priority_id in the current range (for example by using a feedback system or else by using a tabulation: "priority_id" gives bit rate). If the constraint is not met, then it can be decided to do a fallback (selection of the lower range) or ascent (selection of the higher range). The search for the appropriate range and for the <<priority_id>> can be continued until the constraint is obtained.

5. Filtering

This step, which is classic per se, consists in:

Rejecting (or adequately processing, for example by high-bit-rate routing) or the packets for which (P_paq>P_current) and/or (S_paq>S_current) and/or (T_paq>T_current) and/or (Q'_paq>Q_current), Processing the other packets (transmission, storage, etc).

6. Example of Applications of an Embodiment of the Invention

An embodiment of the invention can take account of a large number of applications constraints and can be applied at any point whatsoever of the network that is situated on the path between the encoder and a decoder, in a real-time process or in a process of deferred-time processing.

The following table describes several examples of typical actions and their possible locations in the network.

| Type of action | Location of the actions | | |
|---|---|---|---|
| | Server | Intermediate node | Receiver |
| Bit-rate reduction | Selection of the NALUs by hierarchical level of bit rate | Selection of the NALUs by hierarchical level of bit rate | |
| Definition of a path of dependencies | Restrict the decoding dependencies to a single and predefined path according to TV operator and/or telecom operator strategy | Restrict the decoding dependencies to a single and predefined path according to TV operator and/or telecom operator strategy | Select dependencies permitting an optimal decoding path adapted to the terminal. |
| Packet losses | | Find a dependency path to recover the maximum quality when a packet is lost | Find a dependency path to recover the maximum quality when a packet is lost |

6.1 Context 1: Customer-server Model (Adapting to the Resources and to the Choices of the User)

Figure 14:
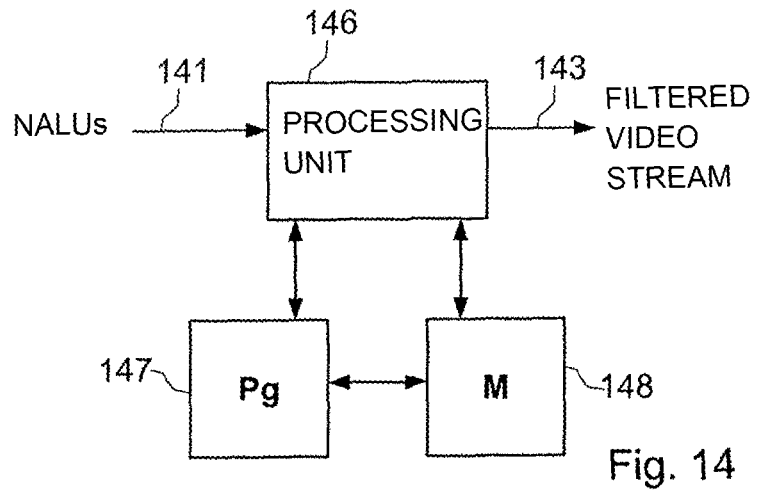
FIGS. 14, 15 and 16 respectively present simplified diagrams of the server, transmission node and terminal according to embodiments of the invention.

FIG. 14 shows the simplified structure of a server according to an embodiment of the invention, comprising a memory M 148, a processing unit 146, equipped for example with a microprocessor and driven by a computer program Pg 147. At initialisation, the code instructions of the computer program 147 are for example loaded into a RAM before being executed by the processor of the processing unit 146. The processing unit 146 receives a set of NALUs 141 at input. The microprocessor µP of the processing unit 146 delivers a filtered video stream 143 as a function of the profile, or path, selected, according to the instructions of the programme Pg 147.

This implementation is illustrated in FIG. 9. The server 91 proposes (911) a choice of applications profiles to the customer 92, as a function of a video stream request 921.

The customer chooses (922) a mode and a point of operation.

The server receives the mode of operation and the point of operation 912 from the customer, as a function of which it filters (913) the elements 914 of the video encoding. Only the packets kept, forming the filtered video 915, are transmitted to the customer. The modes and points of operation can be updated by an external adaptation process 93 receiving reports from the user (or network).

The profiles adapter 93 uses the "RangeOrder" elements of the XML file of profiles.

6.2 Context 2: Server-network-customer Model (Adapting to the Network)

Figure 15:
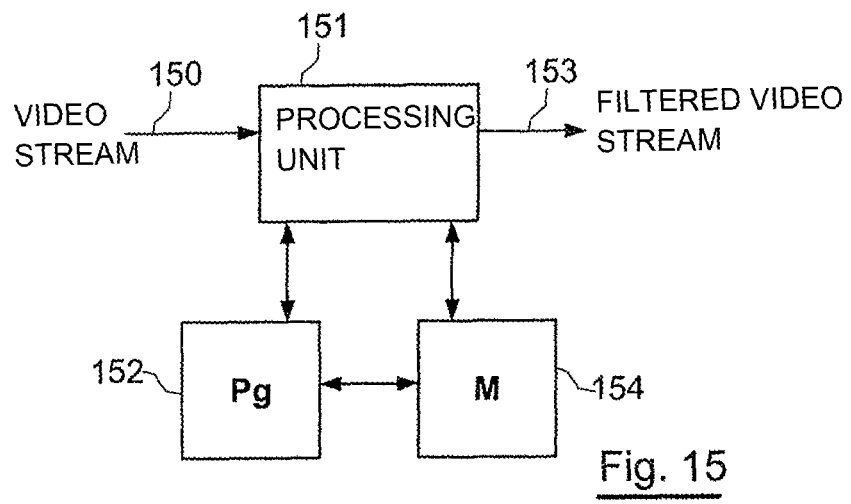

FIG. 15 shows the simplified structure of a network intermediate node according to an embodiment of the invention, comprising a memory M 154, a processing unit 151, equipped for example with a microprocessor and driven by a computer program Pg 152. At initialisation, the code instructions of the computer program 152 are for example loaded into a RAM before being executed by the processor of the processing unit 151. The processing unit 151 receives a video stream 151 at input. The microprocessor µP of the processing unit 151 filters the video stream 151 as a function of a selected profile and delivers a filtered stream 153, according to the instructions of the programme Pg 152.

Figure 10:
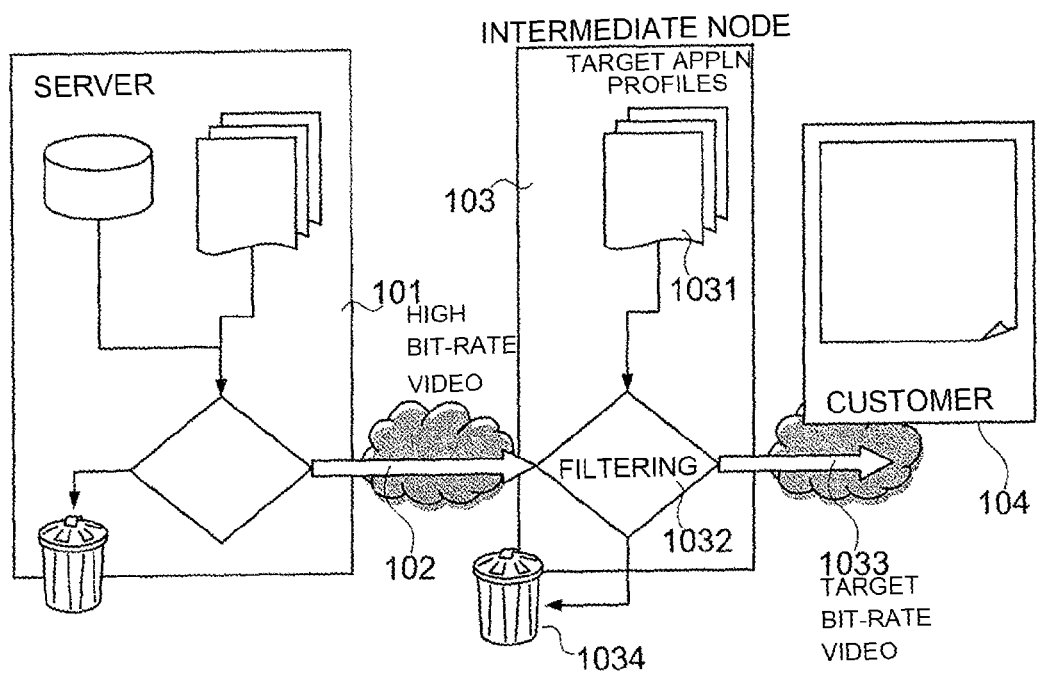

This second implementation is illustrated in FIG. 10.

The server 101 sends a (high bit-rate video) 102 designed for a group of receivers accepting a high-quality image and a high bit rate. Contrary to the previous example which works point to point, this example works in multicast mode.

The intermediate node 103 receives the same stream 102 as the other receivers placed in the network. It has internally at target applications profile 1031 used to drive the filtering algorithm 1032 to reach the target bit rate of the stream 1033, by a limitation 1034 of the off-profile packets. The customer 104 receives this filtered video 10 33.

Should the profile is given by the server mean no longer suited, the intermediate node can compute new profile is directly by analysis of the fields {P,D,T,Q}.

6.3 Adaptation of the Bit Rate to the Resources of the Terminal

Figure 16:
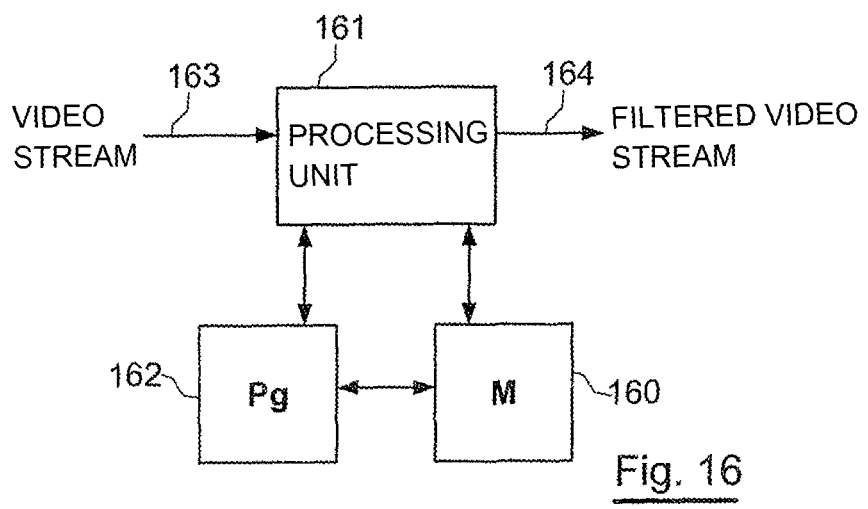

FIG. 16 shows the simplified structure of a terminal according to an embodiment of the invention, comprising a memory M 160, a processing unit 161, equipped for example with a microprocessor and driven by a computer program Pg 162. At initialisation, the code instructions of the computer program 162 are for example loaded into a RAM before being executed by the processor of the processing unit 161. The processing unit 161 receives a video stream 163 at input. The microprocessor µP of the processing unit 161 filters the video stream 163 as a function of the selected profile, according to the instructions of the programme Pg 162. The processing unit 161 delivers a filtered video stream 164 at output.

FIG. 11 gives an example of the adaptation of the display to the resources of a terminal 111, for example a terminal with limited resources. The transportation of the video 112 contains all the information for all the terminals. Depending on the reduced capacity of the terminal, the user may choose (1111), for personal comfort, to give reference to a profile having higher fluidity or a profile having better definition from among those available 1112. For example, the user chooses the "sports" profile.

He furthermore has an MMI at his disposal enabling him to navigate in the quality levels. In particular, he can choose to increase or reduce the point of operation.

The applications profiles are inserted into the general parameters 1121 of the video by SEI message, XML table, UPG or any other means.

The filtering 1113 is done as a function of the selected profile, and the decoder 1114 rebuilds the corresponding images.

6.4 Recovery of Best Quality in the Event of Loss of NAL in a Receiver

Figure 12:
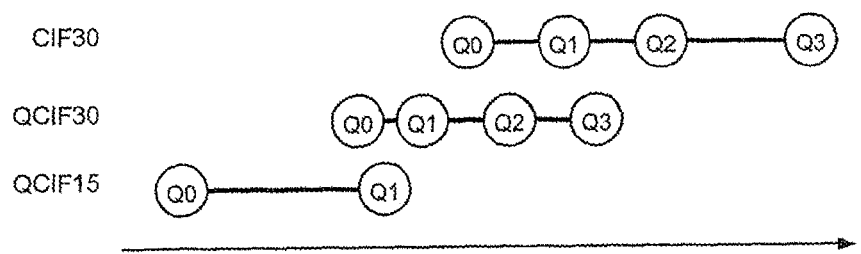
FIG. 12 illustrates the dependencies defined by a profile.

The adapting of the NALUs may vary in the quality ranges corresponding to a level, as indicated in FIG. 12, and the switching from one level to another may be done at the extremities of the range.

If we consider a user receiving the level CIF30, and therefore all the intermediate levels, the description of the applications profiles can be used to retrieve the information that gives the best quality. FIG. 13 shows an example of this approach.

The NALUs 131, 132 and 133 have been lost. The analysis of the fields PDTQ enables retrieval of the available information on best quality pending the next image received without error. The received NALUs 134 and 135 correspond to the missing lower levels and do not allow for the decoding. The operation therefore falls back on the NALU 136.

7. Complete Schema

```
<?xml version="1.0" encoding="UTF-8"?>
<xs:schema xmlns:xs="http://www.w3.org/2001/XMLSchema"
elementFormDefault="qualified">
    <xs:element name="Application">
        <xs:complexType>
            <xs:sequence>
                <xs:element ref="type"/>
                <xs:element ref="path_preference"/>
                <xs:element ref="RangeOrder" minOccurs="1"/>
                <xs:element ref="bit rates"/>
                <!-- to define the type of applications
profile. e.g. "sports", "film", ... -->
                <!-- to illustrate the type of fallback
strategy used. e.g. "temporal", "quality", ... -->
                <!-defines the ranges of operation to be used
in their order; this element is obligatory-->
                <!-enable the definition of the bit rates
associated with the different ranges. e.g. "100-300 400" to indicate
that the first range varies between 100 and 300 kbits; and that the
second range has a bit rate of 400 kbit/s -->
            </xs:sequence>
            <xs:attribute name="name" type="xs:string"
use="required"/>
        </xs:complexType>
        <!-- an application defines a gamut of bit rate ranges
between which there develop -->
    </xs:element>
    <xs:element name="3DSpace">
        <xs:complexType>
            <xs:sequence>
                <xs:element ref="Range" maxOccurs="unbounded"/>
            </xs:sequence>
        </xs:complexType>
        <!-- a 3D space defines a set of bit-rate ranges (Range)
liable to be used to define profiles of applications -->
    </xs:element>
    <xs:element name="MyApplications">
        <xs:complexType>
            <xs:sequence>
                <xs:element ref="Application"
maxOccurs="unbounded"/>
            </xs:sequence>
        </xs:complexType>
        <!-- contains the list of the different applications
profiles -->
    </xs:element>
    <xs:element name="Range">
        <xs:complexType>
            <xs:attribute name="id" type="xs:positiveInteger"
use="required"/>
            <xs:attribute name="S" use="required">
                <xs:simpleType>
                    <xs:restriction base="xs:NMTOKEN">
                        <xs:enumeration value="CIF"/>
                        <xs:enumeration value="QCIF"/>
                        <xs:enumeration value="SD"/>
                        <xs:enumeration value="HD"/>
                    </xs:restriction>
                </xs:simpleType>
                <!-- the field S corresponds to the spatial
level -->
            </xs:attribute>
            <xs:attribute name="T" use="required">
                <xs:simpleType>
                    <xs:restriction base="xs:NMTOKEN">
                        <xs:enumeration value="7.5Hz"/>
                        <xs:enumeration value="15Hz"/>
                        <xs:enumeration value="30Hz"/>
                        <xs:enumeration value="60Hz"/>
                    </xs:restriction>
                </xs:simpleType>
                <!-- the field T corresponds to the temporal
level -->
            </xs:attribute>
            <xs:attribute name="Q" use="required">
                <xs:simpleType>
                    <xs:restriction base="xs:NMTOKEN">
                        <xs:enumeration value="high"/>
                        <xs:enumeration value="med"/>
                        <xs:enumeration value="low"/>
                    </xs:restriction>
                </xs:simpleType>
                <!-- the field Q corresponds to the level of
quality or again to that of complexity -->
            </xs:attribute>
            <xs:attribute name="PMin"
type="xs:nonNegativeInteger" use="required"/>
            <xs:attribute name="PMax"
type="xs:nonNegativeInteger" use="required"/>
            <!-- PMin, PMax define the limits of the range of
operation -->
        </xs:complexType>
        <!-- Range defines operating bit-rate range (defined by
Pmin, Pmax) for a given space-time resolution (defined by S,T,Q) -->
    </xs:element>
    <xs:element name="Root">
        <xs:complexType>
            <xs:sequence>
                <xs:element ref="3DSpace"/>
                <xs:element ref="MyApplications"/>
            </xs:sequence>
        </xs:complexType>
        <!-Definition root of the file. Must contain a definition
of the bit-rate ranges (3DSpace), and a list of applications profiles
(MyApplications) -->
    </xs:element>
    <!-- Definition of the types of syntactic applications used -->
    <xs:element name="debits" type="xs:string"/>
    <xs:element name="RangeOrder" type="xs:string"/>
    <xs:element name="path_preference" type="xs:string"/>
    <xs:element name="type" type="xs:string"/>
</xs:schema>
```

8. Conclusion

An embodiment of the invention provides a technique of fine scalable video representation (in layers) of the data units or packets or NALUs, coming from a scalable video encoder in the 3D space-time-quality domain, this technique being more efficient than the known techniques.

Thus, an embodiment of the invention enables the management of the different paths in this 3D space as a function of the characteristics of the application, the network or the customer's needs.

In other words, an embodiment of the invention provides a technique of this kind that can be used to obtain adapted processing of a same scalable video for different applications.

An embodiment of the invention enables the defining of specific fallback modes that are dependent on or independent of the applications.

An embodiment of the invention enables the definition of specific ascending modes that are dependent on or independent of the applications.

An embodiment of the invention enables the variation in time of the modes and points of operation for a same video stream.

Although the present disclosure has been described with reference to one or more examples, workers skilled in the art will recognize that changes may be made in form and detail without departing from the scope of the disclosure and/or the appended claims.

The invention claimed is:

1. Method for filtering a scalable video stream received by a terminal, organised in data unit blocks each comprising a base data unit and a set of enhancement data units distributed according to at least two types of enhancement data, corresponding respectively to time and/or space and/or quality characteristics and making it possible to define several levels of quality according to the number and type of enhancement data units used, wherein the method comprises the following steps performed by the terminal:

receiving from a server the scalable video stream and parameters defining at least two distinct paths of filtering the data units of each block, each path defining a series of successive fallback positions, from an initial position, each fallback position using at least one data unit less than a preceding position, selecting one of said paths as a function of a predetermined criterion in the terminal taking account of at least one of a type of content of said stream or at least one piece of information representing a capacity of the terminal receiving said stream, separating said enhancement data units, as a function of the selected path, between data units to be used and discarded data units, rebuilding video images using said data units to be used, and storing said discarded data units.

2. Method for filtering a scalable video stream according to claim 1, wherein a first of said paths gives preference to a characteristic representing the quality of each image, rebuilt by a terminal, and a second of said paths gives preference to a characteristic representing the fluidity of the video.

3. Method for filtering a scalable video stream according to claim 1, wherein each of said enhancement data units carries at least two indicators enabling said paths to be defined from among the indicators belonging to a group consisting of:
an indicator of priority;
an indicator of dependency, pertaining to spatial resolution;
an indicator of temporal resolution;
an indicator of quality and/or complexity.

4. Method for filtering a scalable video stream according to claim 1, wherein said paths are stored in a paths file, associating each of said paths with a predetermined applications profile.

5. Method for filtering a scalable video stream according to claim 4, wherein said paths file is transmitted in said video stream, in the form of at least one information data unit.

6. Method for filtering a scalable video stream according to claim 1, wherein the method comprises the following steps:
detection of at least one data unit to be used that is missing or has deteriorated; and
rebuilding of a video from data units corresponding to one of the fallback positions of the selected path.

7. A non-transitory computer-readable carrier comprising a computer program product stored thereon and executable by a microprocessor in a terminal, wherein the product comprises program code instructions for implementing a method for filtering a scalable video stream transmitted by a server towards said terminal, organised in data unit blocks each comprising a base data unit and a set of enhancement data units distributed according to at least two types of enhancement data, corresponding respectively to time and/or space and/or quality characteristics and making it possible to define several levels of quality according to the number and type of enhancement data units used, wherein the method comprises the following steps performed by the terminal:

receiving from a server the scalable video stream and parameters defining at least two distinct paths of filtering the data units of each block, each path defining a series of successive fallback positions, from an initial position, each fallback position using at least one data unit less than the preceding position, selecting one of said paths as a function of a predetermined criterion in a terminal taking account of at least one of a type of content of said stream or at least one piece of information representing a capacity of the terminal receiving said stream, separating said enhancement data units, as a function of the selected path, between data units to be used and discarded data units, rebuilding video images using said data units to be used, and storing said discarded data units.

8. Method of transmission of a scalable video stream by a video stream server to at least one receiver terminal via a transmission network, said stream being organised in data unit blocks each comprising a base data unit and a set of enhancement data units distributed according to at least two types of enhancement data, corresponding respectively to time and/or space and/or quality characteristics and making it possible to define several levels of quality according to the number and type of enhancement data units used, wherein the method comprises:

a step of transmission by said video stream server towards the receiver terminal of the scalable video stream and parameters defining at least two distinct paths of filtering the data units of each block, each path defining a series of successive fallback positions, from an initial position, each fallback position using at least one data unit less than a preceding position, implementing, by an intermediate node of said transmission network, the following steps:
a step of selecting one of said paths as a function of a predetermined criterion taking account of at least one of a type of content of said stream or of at least one piece of information representing a capacity of at least one terminal receiving said stream,
a step of transmission of selected data units towards the receiver terminal,
a step of separating said enhancement data units, as a function of the selected path, between data units to be used and discarded data units,
a step of rebuilding video images using said data units to be used, and
a step of storing said discarded data units.

9. Method of transmission according to claim 8, wherein said intermediate node implements said step of selection as a function of a piece of selection information sent by said receiver terminal.

10. A non-transitory computer-readable carrier comprising a computer program product stored thereon and executable by a microprocessor, wherein the product comprises program code instructions for implementing at least one step of a method of transmission of a scalable video stream by a video stream server to at least one receiver terminal via a transmission network, said stream being organised in data unit blocks each comprising a base data unit and a set of enhancement data units distributed according to at least two types of enhancement data, corresponding respectively to time and/or space and/or quality characteristics and making it possible to define several levels of quality according to the number and type of enhancement data units used, wherein the method comprises:

a step of transmission by said video stream server towards the receiver terminal of the scalable video stream and parameters defining at least two distinct paths of filtering the data units of each block, each path defining a series of successive fallback positions, from an initial position, each fallback position using at least one data unit less than a preceding position, implementing, by an intermediate node of said transmission network, a step of selecting one of said paths as a function of a predetermined criterion taking account of at least one of a type of content of said stream or of at least one piece of information representing a capacity of at least one terminal receiving said stream, and a step of transmission of selected data units towards the receiver terminal, separation of said enhancement data units, as a function of the selected path, between data units to be used and discarded data units, rebuilding of video images using said data units to be used, and storage of said discarded data units.

11. Method of reception in a receiver terminal of a scalable video stream transmitted by a video stream server, via a transmission network, said stream being organised in data unit blocks each comprising a base data unit and a set of enhancement data units distributed according to at least two types of enhancement data, corresponding respectively to time and/or space and/or quality characteristics and making it possible to define several levels of quality according to the number and type of enhancement data units used, wherein the method comprises:

receiving from the server the scalable video stream and parameters defining at least two distinct paths of filtering the data units of each block, each path defining a series of successive fallback positions, from an initial position, each fallback position using at least one data unit less than a preceding position, selecting, by said receiver terminal, one of said paths as a function of a predetermined criterion taking account of at least one of a type of content of said stream or at least one piece of information representing a capacity of the terminal receiving said stream, separating said enhancement data units, as a function of the selected path, between data units to be used and discarded data units, rebuilding video images using said data units to be used, and storing said discarded data units.

12. A non-transitory computer-readable carrier comprising a computer program product stored thereon and executable by a microprocessor, wherein the method comprises program code instructions for implementing at least one step of a method of reception of a scalable video stream transmitted by a video stream server towards a receiver terminal, via a transmission network, said stream being organised in data unit blocks each comprising a base data unit and a set of enhancement data units distributed according to at least two types of enhancement data, corresponding respectively to time and/or space and/or quality characteristics and making it possible to define several levels of quality according to the number and type of enhancement data units used, wherein the method comprises:

receiving from the server the scalable video stream and parameters defining at least two distinct paths of filtering the data units of each block, each path defining a series of successive fallback positions, from an initial position, each fallback position using at least one data unit less than a preceding position, selecting, by said receiver terminal, one of said paths as a function of a predetermined criterion taking account of at least one of a type of content of said stream or at least one piece of information representing a capacity of the terminal receiving said stream, separating said enhancement data units, as a function of the selected path, between data units to be used and discarded data units, rebuilding video images using said data units to be used, and storing said discarded data units.

13. Intermediate node of a video stream transmission network comprising:

means receiving a scalable video stream from another server and, organised in data unit blocks each comprising a base data unit and a set of enhancement data units distributed according to at least two types of enhancement data, corresponding respectively to time and/or space and/or quality characteristics and making it possible to define several levels of quality according to the number and type of enhancement data units used, means for receiving from the other server the scalable video stream and parameters defining at least two distinct paths of filtering the data units of each block, each path defining a series of successive fallback positions, from an initial position, each fallback position using at least one data unit less than a preceding position, means for selecting one of said paths as a function of a predetermined criterion taking account of at least one of a type of content of said stream or at least one piece of information representing a capacity of a terminal receiving said filtered stream, means for separating said enhancement data units, as a function of the selected path, between data units to be used and discarded data units, means for rebuilding video images using said data units to be used, and means for storing said discarded data units.

14. Video stream receiver terminal comprising:

filtering means for filtering a scalable video stream received from a video server and, organised in data unit blocks each comprising a base data unit and a set of enhancement data units distributed according to at least two types of enhancement data, corresponding respectively to time and/or space and/or quality characteristics and making it possible to define several levels of quality according to the number and type of enhancement data units used, wherein said filtering means comprise means of taking account at least two distinct or paths of filtering the data units of each block, the at least two distinct paths being defined by parameters received in addition to the scalable video stream from the video server by the video stream receiver, each path taking defining a series of successive fallback positions, from an initial position, each fallback position using at least one data unit less than a preceding position, and means for selecting one of said paths as a function of a predetermined criterion taking account of at least one of a type of content of said stream or at least one piece of information representing a capacity of the terminal receiving said stream, means for separating said enhancement data units, as a function of the selected path, between data units to be used and discarded data units, means for rebuilding video images using said data units to be used, and means for storing said discarded data units.

15. A method comprising:

generating a signal designed to be transmitted from a video stream server to at least one terminal, to enable the processing of a scalable video stream transmitted by said video stream server, via a transmission network, said stream being organised in data unit blocks each comprising a base data unit and a set of enhancement data units distributed according to at least two types of enhancement data, corresponding respectively to time and/or space and/or quality characteristics and making it possible to define several levels of quality according to the number and type of enhancement data units used, wherein said signal carries the scalable video stream and parameters defining at least two distinct profiles, or paths, of filtering the data units of each block, each path defining a series of successive fallback positions, from an initial position, each fallback position using at least one data unit less than a preceding position, so as to enable a selection of one of said paths by the terminal or an intermediate server as a function of a predetermined criterion taking account of a type of content of said stream and/or at least one piece of information representing a capacity of the terminal receiving said stream;

transmitting the signal from the video stream server toward the at least one terminal, separating said enhancement data units, as a function of the selected path, between data units to be used and discarded data units, rebuilding video images using said data units to be used, and storing said discarded data units.

16. The method according to claim 15, wherein the signal carries said data units forming said video stream and said definition data.

\* \* \* \* \*